United States Patent
Jang et al.

(10) Patent No.: US 11,180,035 B2
(45) Date of Patent: Nov. 23, 2021

(54) CONTROL METHOD AND SYSTEM FOR PREVENTING VEHICLE FROM ROLLING BACKWARDS DOWN SLOPE AND VEHICLE INCLUDING SYSTEM FOR PREVENTING BACKWARD ROLLING

(71) Applicants: Hyundai Motor Company, Seoul (KR); Kia Motors Corporation, Seoul (KR)

(72) Inventors: Sang Pil Jang, Gyeonggi-do (KR); Seung Ho Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 247 days.

(21) Appl. No.: 16/423,874

(22) Filed: May 28, 2019

(65) Prior Publication Data

US 2020/0156481 A1 May 21, 2020

(30) Foreign Application Priority Data

Nov. 15, 2018 (KR) ........................ 10-2018-0141043

(51) Int. Cl.
*B60L 15/20* (2006.01)
*B60L 3/12* (2006.01)

(52) U.S. Cl.
CPC ............. *B60L 15/2018* (2013.01); *B60L 3/12* (2013.01); *B60L 2240/423* (2013.01); *B60L 2250/26* (2013.01)

(58) Field of Classification Search
CPC .... B60L 15/2018; B60L 3/12; B60L 2250/26; B60L 2240/423; B60L 2240/421; B60L 2240/32; B60L 15/2081; B60L 2240/42; B60L 2240/10; Y02T 10/64; Y02T 10/72
See application file for complete search history.

(56) References Cited

U.S. PATENT DOCUMENTS

| | | | | |
|---|---|---|---|---|
| 5,176,234 A | * | 1/1993 | Reik | ...................... B60W 10/02 |
| | | | | 192/53.2 |
| 2021/0061244 A1 | * | 3/2021 | Hawley | ................... B60T 8/175 |

FOREIGN PATENT DOCUMENTS

| | | | | |
|---|---|---|---|---|
| DE | 19838970 A1 | * | 3/2000 | ............ B60W 10/10 |
| KR | 10-2013-0011521 A | | 1/2013 | |

* cited by examiner

*Primary Examiner* — James J Lee
*Assistant Examiner* — Shon G Foley
(74) *Attorney, Agent, or Firm* — Mintz Levin Cohn Ferris Glovsky and Popeo, P.C.; Peter F. Corless

(57) ABSTRACT

A control method and system for preventing a vehicle from rolling backwards down a slope and a vehicle including a system are provided. The control method includes sensing the number of revolutions per minute (RPM) of a motor connected to a driving shaft of the vehicle and comparing the sensed RPM of the motor with a preset RPM to determine whether the vehicle begins to roll backwards. In response to determining that the vehicle begins to roll backwards, driving torque is applied to the motor to prevent the vehicle from rolling backwards.

15 Claims, 4 Drawing Sheets

CONTROL METHOD AND SYSTEM FOR PREVENTING VEHICLE FROM ROLLING BACKWARDS DOWN SLOPE AND VEHICLE INCLUDING SYSTEM FOR PREVENTING BACKWARD ROLLING

CROSS-REFERENCE TO RELATED APPLICATION

This application claims the priority benefit of Korean Patent Application No. 10-2018-0141043, filed on Nov. 15, 2018, the disclosure of which is incorporated herein by reference.

BACKGROUND

1. Field of the Invention

The present invention relates to a control method and system for preventing a vehicle from rolling backwards down a slope, and more particularly to a control method and system for preventing an electric vehicle equipped with an anti-lock braking system (ABS) from rolling backwards down a slope upon resuming travel after stopping.

2. Description of the Related Art

For a vehicle transmission (T/M) having a clutch, when the brake pedal is depressed or engaged, the clutch disposed between the engine and the transmission is switched to an open state, and thus power transmission is interrupted. When the brake pedal is released, the clutch is switched to an engaged state, and thus power transmission is resumed. When a vehicle resumes travel after stopping on a slope, if insufficient power is transmitted to the wheels, the vehicle may roll backwards down the slope.

Meanwhile, for an electric brake system (EBS) having an anti-roll back (ARB) function or an easy hill start (EHS) function, which maintains brake pressure even when a driver releases the brake pedal on a slope, a controller is capable of regulating the brake pressure, thus enabling the vehicle to resume travel without rolling backwards down a slope when the driver releases the brake pedal to move the vehicle.

However, in many cases, an electric vehicle is equipped with an anti-lock brake system, rather than with an electric brake system. For a vehicle equipped with an anti-lock brake system, when the brake pedal is released to resume travel after stopping on a slope, the brake pressure is not maintained, causing the vehicle to roll backwards. Therefore, there is a need for the development of technology to prevent an electric vehicle equipped with an anti-lock braking system from rolling backwards down a slope when a brake pedal is released to resume movement after stopping.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides a control method and system for preventing a vehicle from rolling backwards down a slope, which is capable of preventing an electric vehicle equipped with an anti-lock braking system (ABS) from rolling backwards down a slope upon resuming travel after stopping by applying driving torque to a motor directly connected to a driving shaft, and a vehicle including a system for preventing backward rolling.

In accordance with an aspect of the present invention, the above and other objects can be accomplished by a control method for preventing a vehicle from rolling backwards down a slope, the control method may include determining whether the vehicle begins to roll backwards, and upon determining that the vehicle begins to roll backwards, applying driving torque to a motor to prevent the vehicle from rolling backwards.

The determination of whether the vehicle begins to roll backwards may include sensing the number of revolutions per minute (RPM) of the motor, the motor being connected to a driving shaft of the vehicle, and comparing the sensed RPM of the motor with a preset RPM to determine whether the vehicle begins to roll backwards. The control method may further include, before the sensing the RPM of the motor, determining whether the vehicle is in a stopped state on a slope or inclined surface, and determining whether a brake pedal of the vehicle was released to resume movement.

In the determination whether the vehicle begins to roll backwards, when the shift range of the vehicle is the drive (D)-range, if the sensed RPM of the motor is equal to or less than a preset negative (−) RPM, the vehicle may be determined to begin to roll backwards. In addition, when the shift range of the vehicle is the reverse (R)-range, if the sensed RPM of the motor is equal to or greater than a preset positive (+) RPM, the vehicle may be determined to be starting to roll forward.

The control method may further include, upon sensing depression or engagement of the brake pedal during application of driving torque to the motor in response to determining that the vehicle begins to roll backwards, counting the time period of depression of the brake pedal, and stopping application of driving torque to the motor when the counted time period exceeds a preset time period.

In accordance with another aspect of the present invention, a control system for preventing a vehicle from rolling backwards down a slope may include a motor connected to a driving shaft of the vehicle, a sensing unit configured to sense the RPM of the motor, and a controller configured to determine whether the vehicle begins to roll backwards. In response to determining that the vehicle begins to roll backwards, the controller may be configured to apply driving torque to the motor to prevent backward rolling of the vehicle.

The control system may further include a database unit configured to store a preset RPM to determine whether the vehicle begins to roll backwards. The controller may then be configured to compare the sensed RPM of the motor with the preset RPM to determine whether the vehicle begins to roll backwards. Before the RPM of the motor is sensed, the controller may be configured to determine whether the vehicle is in a stopped state on a slope and determine whether the brake pedal of the vehicle was released to resume movement.

When the shift range of the vehicle is the D-range, if the sensed RPM of the motor is equal to or less than a preset negative (−) RPM, the controller may be configured to determine that the vehicle begins to roll backwards. When the shift range of the vehicle is the R-range, if the sensed RPM of the motor is equal to or greater than a preset positive (+) RPM, the controller may be configured to determine that the vehicle begins to roll forwards. While applying driving torque to the motor after determining that the vehicle begins to roll backwards, if depression of the brake pedal is sensed, the controller may be configured to count the time period of depression of the brake pedal, and stop application of driving torque to the motor when the counted time period exceeds a preset time period.

In accordance with a further aspect of the present invention, a vehicle is provided including the above-described control system for preventing a vehicle from rolling backwards down a slope. The controller may be configured to compare the sensed RPM of the motor with a preset RPM to determine whether the vehicle begins to roll backwards.

When the shift range of the vehicle is the D-range, if the sensed RPM of the motor is equal to or less than a preset negative (−) RPM, the controller may be configured to determine that the vehicle begins to roll backwards. When the shift range of the vehicle is the R-range, if the sensed RPM of the motor is equal to or greater than a preset positive (+) RPM, the controller may be configured to determine that the vehicle begins to roll forwards. While applying driving torque to the motor after determining that the vehicle begins to roll backwards, if depression of the brake pedal is sensed, the controller may be configured to count the time period of depression of the brake pedal, and stop application of driving torque to the motor when the counted time period exceeds a preset time period.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a control method and system for preventing a vehicle from rolling backwards down a slope and a vehicle including a system for preventing backward rolling according to an exemplary embodiment of the present invention will be described in detail with reference to the accompanying drawings.

Figure 1:
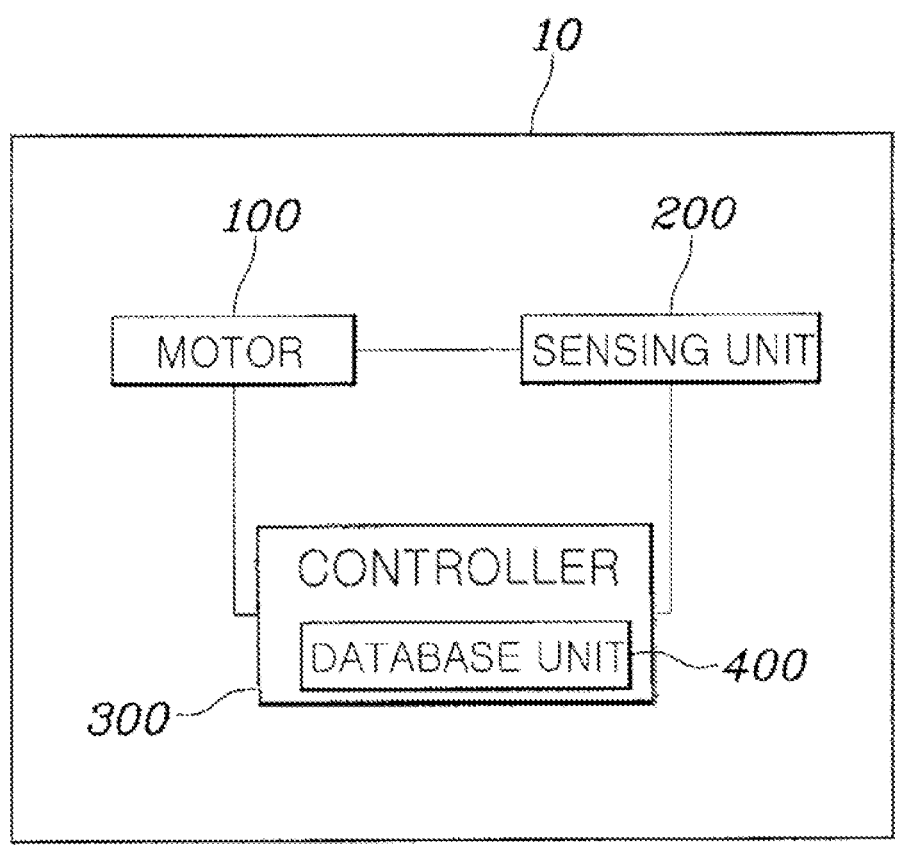
FIG. 1 is a block diagram showing a control system for preventing a vehicle from rolling backwards down a slope and a vehicle including the control system for preventing backward rolling according to one exemplary embodiment of the present invention.
Figure 2:
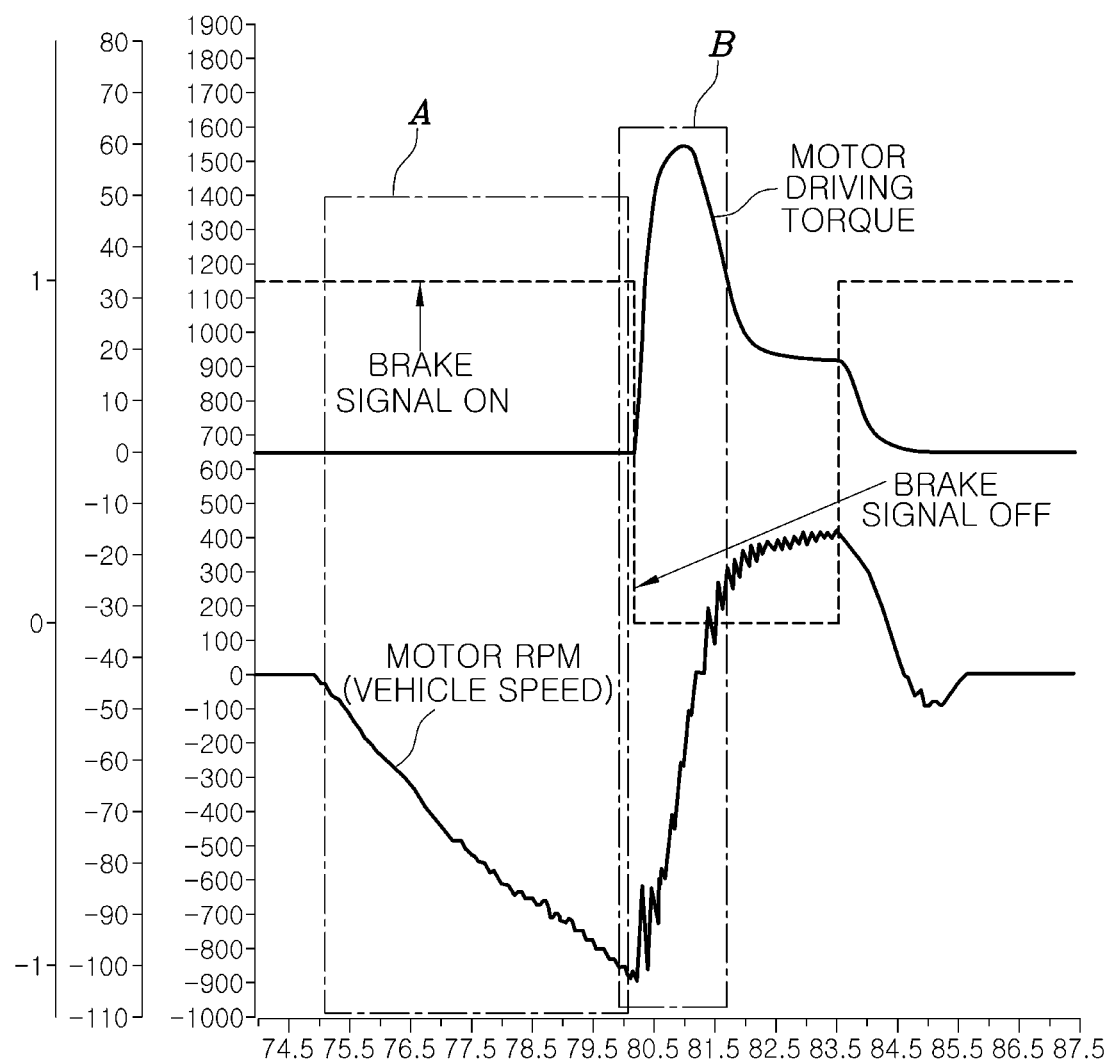
FIG. 2 is a graph showing a brake signal, a motor driving torque signal and the number of revolutions per minute (RPM) of a motor when a conventional electric vehicle equipped with an anti-lock braking system resumes movement after stopping on a slope according to the related art.
Figure 3:
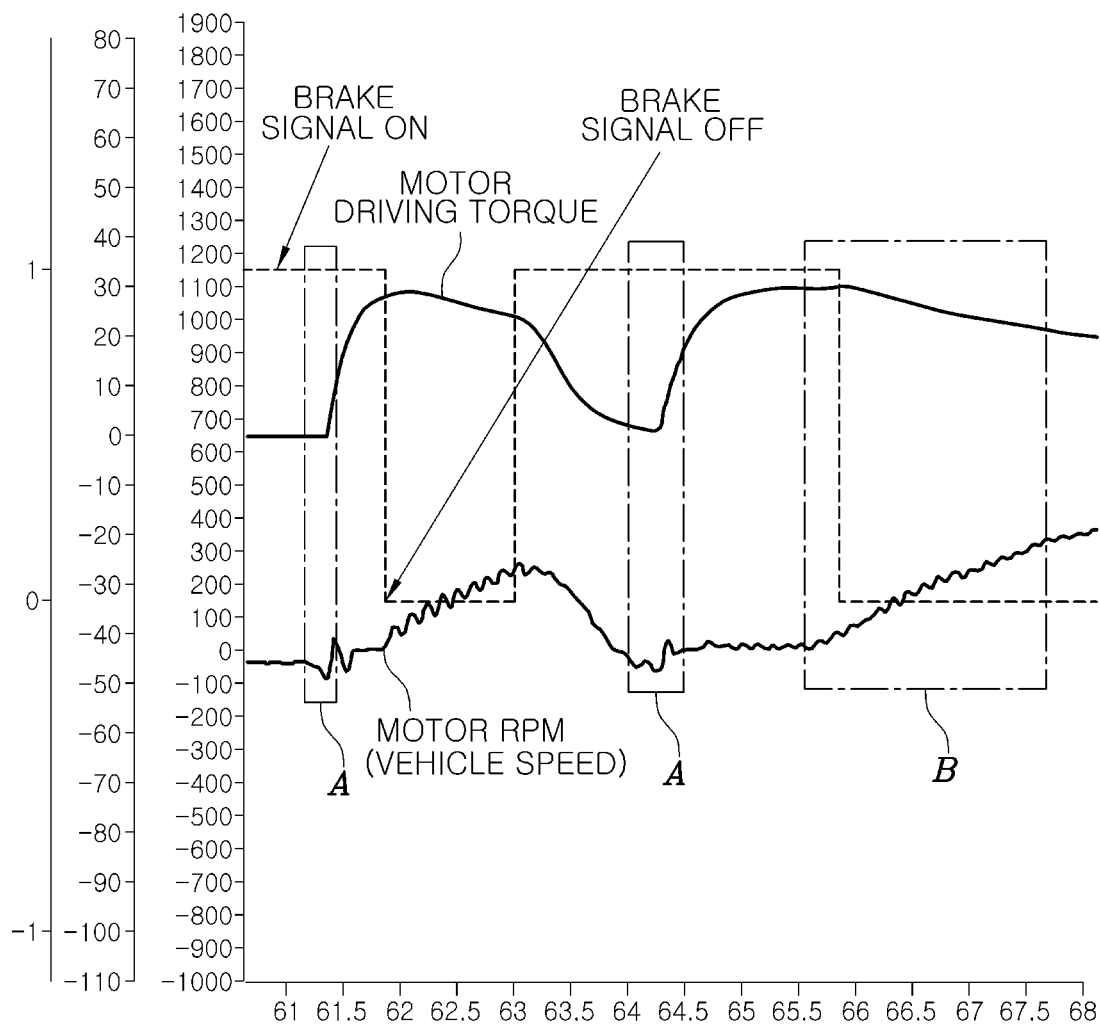
FIG. 3 is a graph showing a brake signal, a motor driving torque signal and the RPM of a motor when an electric vehicle including the control system for preventing backward rolling according to one exemplary embodiment of the present invention resumes movement after stopping on a slope.
Figure 4:
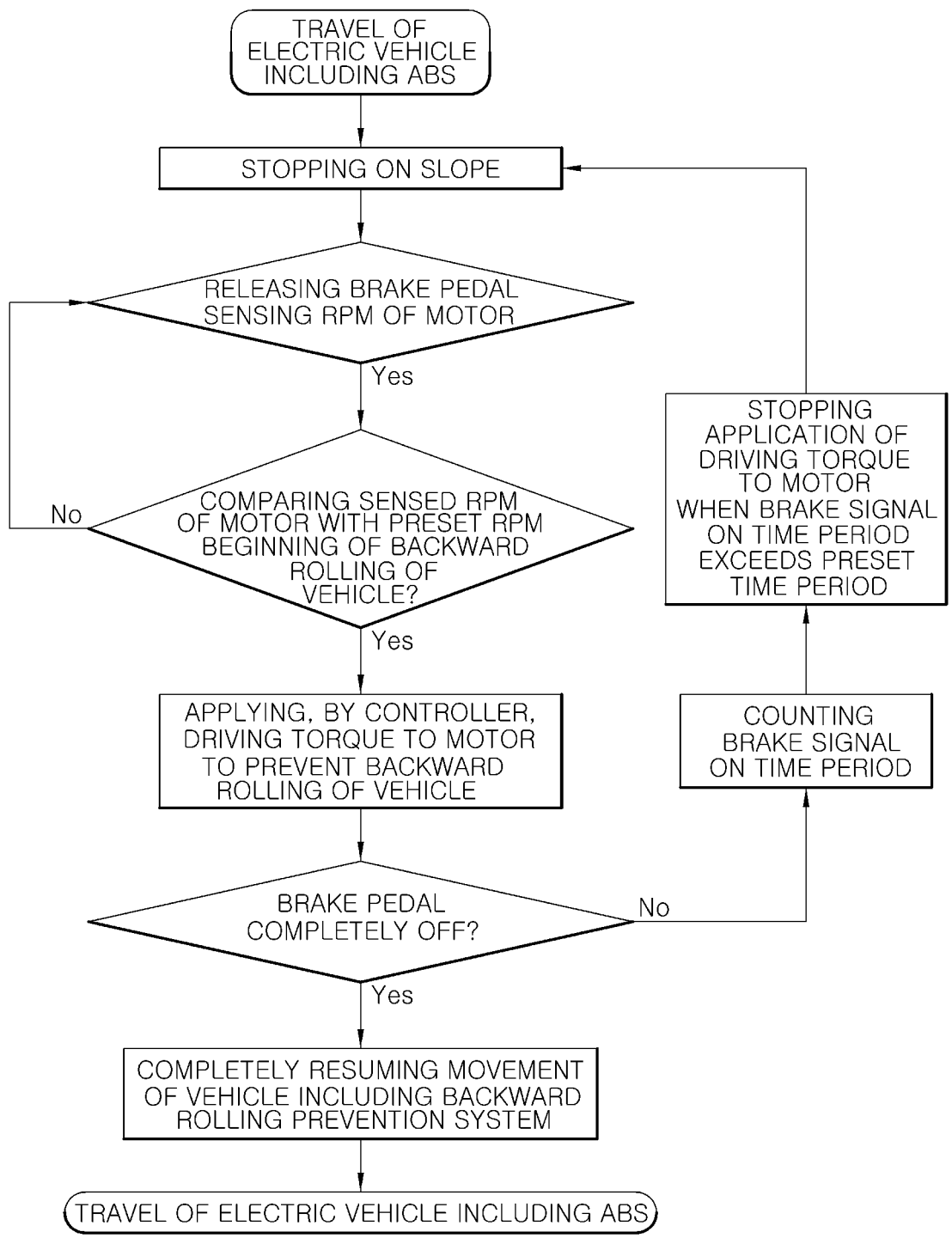
FIG. 4 is a flowchart showing a control method of preventing a vehicle from rolling backwards down a slope according to one exemplary embodiment of the present invention.

FIG. 1 is a block diagram showing a control system for preventing a vehicle from rolling backwards down a slope and a vehicle including the control system for preventing backward rolling according to one exemplary embodiment of the present invention. FIG. 2 is a graph showing a brake signal, a motor driving torque signal and the number of revolutions per minute (RPM) of a motor when a conventional electric vehicle equipped with an anti-lock braking system resumes movement after stopping on a slope. FIG. 3 is a graph showing a brake signal, a motor driving torque signal and the RPM of a motor when an electric vehicle including the control system for preventing backward rolling according to one exemplary embodiment of the present invention resumes movement after stopping on a slope. FIG. 4 is a flowchart showing a control method of preventing a vehicle from rolling backwards down a slope according to one exemplary embodiment of the present invention.

As shown in FIG. 1, a control system for preventing a vehicle from rolling backwards down a slope according to one exemplary embodiment of the present invention is installed in a vehicle 10. The control system may include a motor 100 connected to a driving shaft, a sensing unit 200 (e.g., a plurality of sensors) configured to sense the RPM of the motor 100, and a controller 300 configured to compare the RPM of the motor 100 with a preset RPM to determine whether the vehicle begins to roll backwards and configured to apply driving torque to the motor 100 to prevent backward rolling of the vehicle in response to determining that the vehicle begins to roll backwards.

In addition, the control system may further include a database unit 400 configured to store a preset RPM to determine whether the vehicle begins to roll backwards. Notably, the database unit 400 is a memory included in the controller. The preset RPM may be about 25 RPM, but the present invention is not limited thereto. Particularly, the motor 100 may be directly connected to the driving shaft of the vehicle.

Hereinafter, for convenience of description, the vehicle will be described as an electric vehicle equipped with an anti-lock braking system (ABS). However, the present invention is not limited thereto. The present invention is applicable to any one of various other types of vehicles, so long as the vehicle is equipped with an ABS and a motor. Further, the controller 300 according to the present invention may be a vehicle control unit (VCU), configured to adjust the motor driving torque in response to confirming the backward rolling of the vehicle based on information sensed by the sensing unit 200.

Hereinafter, the control method for preventing the vehicle from rolling backwards down a slope upon resuming travel after stopping, which is performed by the controller 300, will be described with reference to FIGS. 2 and 3. In a conventional electric vehicle equipped with an ABS, a vehicle control unit (VCU) (not shown) is configured to apply driving torque to a motor in response to a brake ON/OFF signal, which is received from a sensing unit (not shown) configured to sense the depressed/released (e.g., engagement and release) state of the brake pedal. In other words, when the brake signal is ON (e.g., when the brake pedal is depressed or engaged), driving torque is not applied to the motor, and when the brake signal is OFF (e.g., when the brake pedal is released), driving torque is applied to the motor.

Particularly, referring to the brake signal and the motor driving torque signal in FIG. 2, in the conventional electric vehicle equipped with an ABS, the controller is configured to operate the vehicle by adjusting the motor driving torque in response to the brake ON/OFF signal. In the graph shown in FIG. 2, the box of the dotted line A represents the state in which the brake signal of an electric vehicle stopping on a slope is ON, i.e. the state in which the brake pedal of the electric vehicle stopping on a slope is depressed. At this time, the RPM of the motor increases in a negative (−) direction when the vehicle is stopped, which indicates that the vehicle begins to roll backwards down a slope or inclined surface.

Further, although the brake signal is ON, i.e. the brake pedal is in a depressed state, if the driver slowly releases the brake pedal or slightly depresses the brake pedal on a slope, the vehicle rolls backwards since the hydraulic pressure of the brake system becomes less than the load applied to the vehicle due to the inclination of the road. In addition, as shown in FIG. 2, although the driver slightly depresses the brake pedal, the brake signal is ON, and thus, the controller is configured to maintain the motor driving torque at zero. As a result, the hydraulic pressure of the brake system becomes less than the load applied to the vehicle due to the inclination of the slope, leading to backward rolling of the vehicle.

However, in the control system for preventing a vehicle from rolling backwards down a slope according to one exemplary embodiment of the present invention and the vehicle 10 including the control system, the controller 300 may be configured to compare the RPM of the motor 100, directly connected to the driving shaft, with a preset RPM irrespective of the brake ON/OFF signal to determine whether the vehicle begins to roll backwards. When the shift range of the vehicle 10 is the D-range, if the RPM of the motor 100 sensed by the sensing unit 200 is equal to or less than a preset negative (−) RPM, the controller 300 may be configured to determine that the vehicle 10 begins to roll backwards. In particular, the state in which the shift range of the vehicle 10 is the D-range may be indicative of the vehicle 10 climbing up a slope (e.g., being driven up an inclined road). In other words, although the shift range of the vehicle 10 is the D-range when the vehicle 10 is being driven up a slope, if the RPM of the motor is equal to or less than a preset negative (−) RPM, the controller 300 may be configured to determine that the vehicle 10 begins to roll backwards.

Further, when the shift range of the vehicle 10 is the R-range, if the RPM of the motor 100 sensed by the sensing unit 200 is equal to or greater than a preset positive (+) RPM, the controller 300 may be configured to determine that the vehicle 10 begins to roll forwards. Particularly, the state in which the shift range of the vehicle 10 is the R-range may be indicative of the vehicle 10 backing up a slope (e.g., being driven up a slope in reverse). In other words, although the shift range of the vehicle 10 is the R-range when the vehicle 10 backs up a slope, if the RPM of the motor is equal to or greater than a preset positive (+) RPM, the controller 300 may be configured to determine that the vehicle 10 begins to roll forwards.

Hereinafter, the operation of the control system for preventing a vehicle from rolling backwards down a slope according to the present invention and the operation of the vehicle 10 equipped with the control system will be described with reference to FIG. 3. As represented by the box of the dotted line A, when the brake signal is ON but the RPM of the motor is equal to or less than a preset RPM, the controller 300 may be configured to apply driving torque to the motor 100 to prevent the vehicle from rolling backwards down a slope. In other words, the load applied to the vehicle due to the inclination of the slope is offset by applying driving torque to the motor 100, thereby preventing the vehicle from rolling backwards down a slope.

Further, since driving torque is applied to the motor when the brake signal is ON but the RPM of the motor is equal to or less than a preset RPM, as represented by the box of the dotted line B, when the brake signal is completely turned OFF (e.g., completely disengaged) to resume movement, the vehicle may resume movement without rolling backwards down a slope. Meanwhile, while the controller 300 applies driving torque to the motor 100 after determining that the vehicle begins to roll backwards, when depression of the brake pedal is sensed, the controller 300 may be configured to count the time period of depression of the brake pedal. In other words, the controller 300 may be configured to determine how long the brake pedal remains engaged. The reason for counting the time period of depression of the brake pedal is to determine whether the driver intends to maintain the vehicle in a stopped state or to resume movement of the vehicle.

Additionally, the controller 300 may be configured to compare the counted time period of depression of the brake pedal with a preset time period, and stop the application of driving torque to the motor 100 when the counted time period exceeds a preset time period. The preset time period may be about 5 s, but the present invention is not limited thereto. When the counted time period exceeds a preset time period, it may be possible to prevent overheating of the motor or an increase in abrasion of the brake pads due to continuous application of driving torque to the motor since the controller stops the driving torque application.

As shown in FIG. 4, a control method for preventing a vehicle from rolling backwards down a slope according to one exemplary embodiment of the present invention may include determining whether the vehicle begins to roll backwards and applying driving torque to the motor to prevent the vehicle from rolling backwards in response to determining that the vehicle begins to roll backwards. The determination of whether the vehicle begins to roll backwards may include sensing the RPM of the motor connected to the driving shaft of the vehicle and comparing the sensed RPM of the motor with a preset RPM to determine whether the vehicle begins to roll backwards.

In addition, the control method may further include, before sensing the RPM of the motor, determining whether the vehicle is in a stopped state on a slope and determining whether the brake pedal of the stopped vehicle was released to resume movement Specifically, in the determination of whether the vehicle begins to roll backwards, when the shift range of the vehicle is the D-range, if the sensed RPM of the motor is equal to or less than a preset negative (−) RPM, the vehicle may be determined to begin to roll backwards. The state in which the shift range of the vehicle is the D-range may be indicative of the vehicle climbing up a slope. In other words, although the shift range of the vehicle is the D-range when the vehicle is driven up a slope, if the RPM of the motor is equal to or less than a preset negative (−) RPM, the vehicle may be determined to begin to roll backwards.

Further, when the shift range of the vehicle is the R-range, if the sensed RPM of the motor is equal to or greater than a preset positive (+) RPM, the vehicle may be determined to begin to roll forwards. The state in which the shift range of the vehicle is the R-range may be indicative of the vehicle reversing up a slope. In other words, although the shift range of the vehicle is the R-range when the vehicle is driven in reverse up a slope, if the RPM of the motor is equal to or greater than a preset positive (+) RPM, the vehicle may be determined to begin to roll forwards.

The control method may further include counting the time period of depression of the brake pedal upon sensing depression of the brake pedal during application of driving torque to the motor in response to a determination that the vehicle begins to roll backwards, and stopping the application of driving torque to the motor when the counted time period exceeds a preset time period. Accordingly, since the counted time period of depression of the brake pedal is compared with a preset time period and the application of driving torque to the motor is stopped when the counted time period exceeds a preset time period, it may be possible to prevent overheating of the motor or an increase in abrasion of the brake pads due to continuous application of driving torque to the motor.

As is apparent from the above description, according to the present invention, in response to determining that a vehicle begins to roll backwards down a slope upon resuming travel after stopping, driving torque may be applied to the motor, thereby preventing backward rolling of the vehicle. In addition, it may be possible to prevent backward rolling of the vehicle on a slope by adjusting a driving motor commonly installed in the vehicle without adding an anti-roll back (ARB) function or an easy hill start (EHS) function to the vehicle, thereby reducing manufacturing costs. Further, it may be possible to prevent a collision with a following vehicle (e.g., a vehicle traveling behind the subject vehicle) on a slope due to backward rolling, thereby improving the safety and drivability of the vehicle.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A control method for preventing a vehicle from rolling backwards down a slope, comprising:
    determining, by a controller, whether the vehicle begins to roll backwards;
    in response to determining that the vehicle begins to roll backwards, applying, by the controller, driving torque to a motor to prevent the vehicle from rolling backwards;
    upon sensing depression of a brake pedal during application of driving torque to the motor in response to a determination that the vehicle begins to roll backwards, counting, by the controller, a time period of depression of the brake pedal; and
    stopping, by the controller, application of driving torque to the motor when the counted time period exceeds a preset time period.

2. The control method according to claim 1, wherein determining whether the vehicle begins to roll backwards includes:
    sensing, by the controller, a number of revolutions per minute (RPM) of the motor, wherein the motor is connected to a driving shaft of the vehicle; and
    comparing, by the controller, the sensed RPM of the motor with a preset RPM to determine whether the vehicle begins to roll backwards.

3. The control method according to claim 2, further comprising: before the sensing the RPM of the motor:
    determining, by the controller, whether the vehicle is in a stopped state on a slope; and
    determining, by the controller, whether a brake pedal of the vehicle was released to resume movement.

4. The control method according to claim 2, further comprising:
    determining, by the controller, that the vehicle begins to roll backwards when a shift range of the vehicle is a drive (D)-range, when the sensed RPM of the motor is equal to or less than a preset negative (−) RPM.

5. The control method according to claim 2, further comprising:
    determining, by the controller, that the vehicle begins to roll forwards when a shift range of the vehicle is a reverse (R)-range, when the sensed RPM of the motor is equal to or greater than a preset positive (+) RPM.

6. A control system for preventing a vehicle from rolling backwards down a slope, comprising:
    a motor connected to a driving shaft of the vehicle;
    a sensing unit configured to sense a revolutions per minute (RPM) of the motor; and
    a controller configured to determine whether the vehicle begins to roll backwards,
    wherein, in response to determining that the vehicle begins to roll backwards, the controller is configured to apply driving torque to the motor to prevent backward rolling of the vehicle, and
    wherein, while applying driving torque to the motor after determining that the vehicle begins to roll backwards, when depression of a brake pedal is sensed, the controller is configured to count a time period of depression of the brake pedal, and stop application of driving torque to the motor when the counted time period exceeds a preset time period.

7. The control system according to claim 6, further comprising:
    a database unit configured to store a preset RPM to determine whether the vehicle begins to roll backwards.

8. The control system according to claim 7, wherein the controller is configured to compare the sensed RPM of the motor with the preset RPM to determine whether the vehicle begins to roll backwards.

9. The control system according to claim 6, wherein, before the RPM of the motor is sensed, the controller is configured to determine whether the vehicle is in a stopped state on a slope and determine whether a brake pedal of the vehicle was released to resume movement.

10. The control system according to claim 8, wherein, when a shift range of the vehicle is a drive (D)-range, when the sensed RPM of the motor is equal to or less than a preset negative (−) RPM, the controller is configured to determine that the vehicle begins to roll backwards.

11. The control system according to claim 8, wherein, when a shift range of the vehicle is a reverse (R)-range, when the sensed RPM of the motor is equal to or greater than a preset positive (+) RPM, the controller is configured to determine that the vehicle begins to roll forwards.

12. A vehicle comprising the control system for preventing a vehicle from rolling backwards down a slope according to claim 6.

13. The vehicle according to claim 12, wherein the controller is configured to compare the sensed RPM of the motor with a preset RPM to determine whether the vehicle begins to roll backwards.

14. The vehicle according to claim 12, wherein, when a shift range of the vehicle is a drive (D)-range, when the sensed RPM of the motor is equal to or less than a preset negative (−) RPM, the controller is configured to determine that the vehicle begins to roll backwards.

15. The vehicle according to claim 12, wherein, when a shift range of the vehicle is a reverse (R)-range, when the sensed RPM of the motor is equal to or greater than a preset positive (+) RPM, the controller is configured to determine that the vehicle begins to roll forwards.

* * * * *